Figure 1:
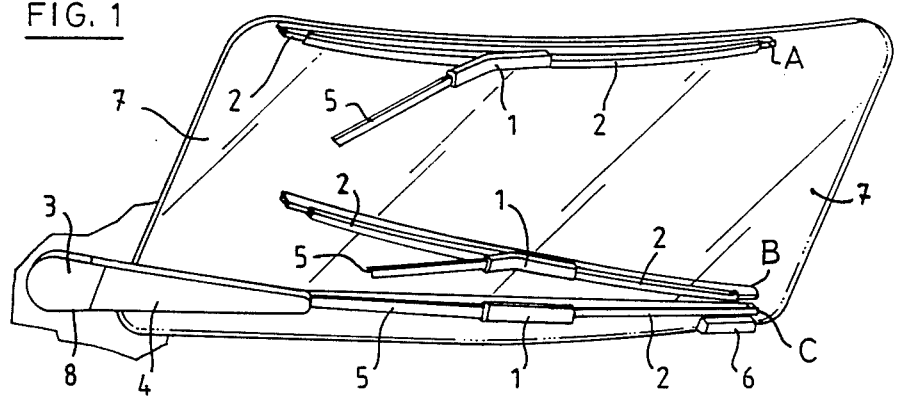

United States Patent [19]
Scorsiroli

[11] Patent Number: 4,949,421
[45] Date of Patent: Aug. 21, 1990

[54] CONNECTOR FOR A WIPER SYSTEM

[75] Inventor: Marcello Scorsiroli, Turin, Italy

[73] Assignee: Champion Spark Plug Italiana SpA, Italy

[21] Appl. No.: 289,602

[22] Filed: Dec. 22, 1988

[30] Foreign Application Priority Data

Jan. 29, 1988 [IT] Italy ................ 67060 A/88

[51] Int. Cl.⁵ .......................... B60S 1/42
[52] U.S. Cl. .................. 15/250.32; 15/250.31; 15/250.42
[58] Field of Search ............ 15/250.32, 250.31, 250.42

[56] References Cited

U.S. PATENT DOCUMENTS

| | | | |
|---|---|---|---|
| 1,694,245 | 12/1928 | Baker et al. | 15/250.23 |
| 2,587,168 | 2/1952 | Kessler | 15/250.23 X |
| 3,383,731 | 5/1968 | Krohm | 15/250.23 X |
| 3,393,421 | 7/1968 | Wise | 15/250.32 X |
| 3,453,679 | 7/1969 | Thorlakson | 15/250.32 X |
| 3,461,477 | 8/1969 | Ikner | 15/250.32 X |
| 3,621,507 | 11/1971 | Allaria et al. | 15/250.32 |
| 3,837,033 | 9/1974 | van den Berg et al. | 15/250.32 |
| 4,347,640 | 5/1982 | Durtnau | 15/250.32 |

FOREIGN PATENT DOCUMENTS

| | | |
|---|---|---|
| 2513273 | 10/1976 | Fed. Rep. of Germany . |
| 2530801 | 1/1977 | Fed. Rep. of Germany . |
| 2622437 | 4/1980 | Fed. Rep. of Germany . |
| 2415181 | 4/1982 | Fed. Rep. of Germany . |
| 2090560 | 12/1971 | France . |
| 2288653 | 5/1976 | France . |

*Primary Examiner*—Frankie L. Stinson
*Attorney, Agent, or Firm*—Wood,Phillips,Mason,Recktenwald & Vansanten

[57] ABSTRACT

The connector 1 is made in one piece out of a plastic material. It comprises a first portion 1a rigidly secured to the wiper arm extension 5, a second portion 1b rotatably secured at 9, 9a to a wiper blade (not shown) and a resilient intermediate portion 1c. The connector 1 is part of a wiper system wherein it is indispensable that the wiper blade can rotate with respect to the wiper arm extension 5 about an axis substantially perpendicular to the surface to be wiped and passing through the connector.

33 Claims, 2 Drawing Sheets

CONNECTOR FOR A WIPER SYSTEM

The present invention relates to a connector for a wiper system of a motor vehicle or the like, said wiper system also comprising an oscillating mounting head, a channel rotatably connected to the mounting head, an arm extension rigidly secured to the channel and provided with a free end portion, a wiper blade attached to the arm extension by means of the connector and stop means located on the surface to be wiped or on the body of the motor vehicle and capable of imparting a rotational movement to the wiper blade.

As known in prior art, and in particular through German (DE) patent No. 26 22 437, the above defined wiper system works as follows. The wiper blade oscillates with the mounting head, the channel and the arm extension. Said stop means is positioned in such a way that when the outer end of the wiper blade abuts against it the wiper blade is forced to rotate about an axis substantially perpendicular to the surface to be wiped and passing through the stop means. The consequence of this rotational movement of the wiper blade is that it is forced to also rotate about an axis substantially perpendicular to the surface to be wiped and passing through the connector (between the arm extension and the blade) and the transverse mid-section of the blade.

The thus described wiper system allows to substantially increase the wiped surface when compared to a conventional oscillating wiper system and it implies not only that the wiper blade can rotate with respect to the arm extension about an axis substantially perpendicular to the surface to be wiped, but also (as will be explained hereafter) that spring means must be provided between the arm extension and the wiper blade.

The connector disclosed in German (DE) patent 26 22 437 comprises two parts respectively secured to the arm extension and to the wiper blade. A helical torsion spring is located between and inside said two parts. This connector thus comprises three different parts and its structure is relatively complicated.

The object of the invention is to provide a connector such as defined above, but comprising only one, or possibly two parts, i.e. to provide a connector which is by far less expensive than similar connectors known in prior art.

The connector according to the invention is substantially characterized by the fact that it is made in one piece out of an appropriate plastic material and that it consists of a first portion rigidly secured to the free end portion of the arm extension, of a second portion rotatably attached to the wiper blade and of a resilient intermediate portion located between said first and second portions.

Further features of the connector according to the invention are for example:
the connector has either an elbow-shaped or a straight configuration when the wiper system is in its rest position,
the resilience of the intermediate portion of the connector is reinforced either by a resilient, elbow-shaped or by a straight, resilient blade, and
the resilient intermediate portion of the connector has locally a reduced cross section.

Figure 2:
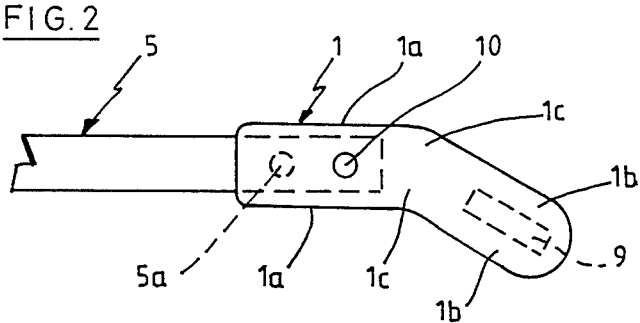
Figure 3:
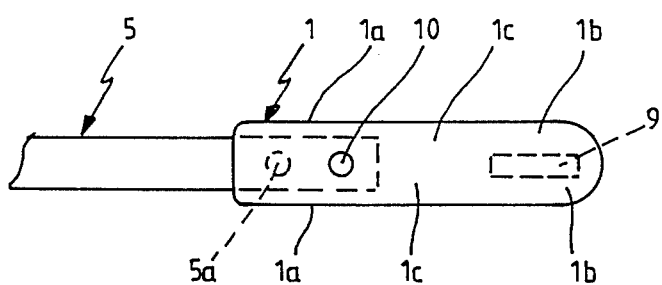
Figure 4:
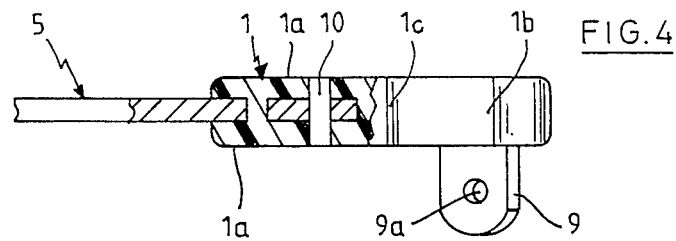
Figure 5:
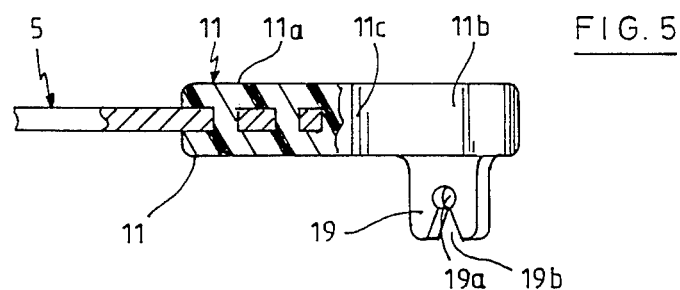
Figure 6:
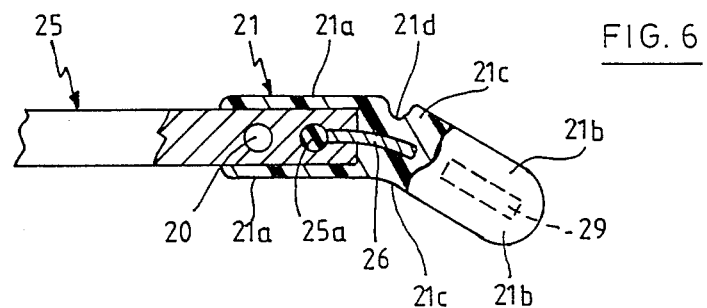
Figure 7:
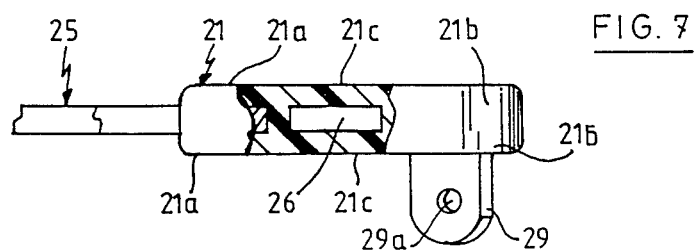

The connector according to the invention will be better understood when reading the following portions of the specification in conjunction with the appended drawings wherein:

FIG. 1 is a general perspective view of the connector and wiper system according to the invention, FIG. 2 is a top view of a first embodiment of the connector according to the invention, FIG. 3 is a top view of the connector of FIG. 1 when the wiper arm is in a different position on the surface be wiped, FIG. 4 is an elevational view, partially in section, of a first variant of the connector of FIG. 2, FIG. 5 is an elevational view, partially in section, of a second variant of the connector of FIG. 2, FIG. 6 is a top view, partially in section, of a second embodiment of the connector according to the invention, and FIG. 7 is an elevational view, partially in section, of the connector of FIG. 6.

In FIG. 1 the connector and wiper system according to the invention is shown in different working positions on the surface to be wiped 7. Position "A" is the rest position, position "C" is the return position and position "B" is an intermediate position.

The wiper system essentially comprises: a mounting head 3 which oscillates with a drive shaft (not shown) projecting out of the vehicle body 8, a channel 4 rotatably connected to the mounting head 3 and biased towards the surface to be wiped 7 by spring means (not shown), an arm extension 5 rigidly secured to the channel 4, the connector according to the invention 1, a wiper blade 2 rotatably attached to the free end portion of the arm extension 5 by the connector 1, and stop means 6 provided on the surface to be wiped 7 (or on the vehicle body 8).

When the wiper system works the wiper blade 2 moves in a circular movement from its rest position "A" to the return position "C". Before reaching said return position "C" the outer end of the wiper blade 2 will abut (position "B") against the stop means 6 and will then be forced by the arm 3, 4, 5 to rotate about said stop means 6 in order to be able to come into the return position "C". This rotation implies that the wiper blade 2 is also capable of rotating about an axis which is substantially perpendicular to the surface to be wiped 7 and which passes through the connector 1.

When the wiper blade 2 moves from the return position "C" to the rest position "A" via the intermediate position "B", it must be capable of retaking its initial positions "B" and "A" with respect to the wiper arm 3, 4, 5 and therefore it is indispensable that the connector either includes spring means or that said spring means is replaced by other means, i.e. for example by the resilient intermediate portion of the one-piece connector according to the invention.

FIG. 2 and FIG. 4 show a variant of the first embodiment of the connector (1) according to the invention when the wiper blade 2 is in its rest position "A" (FIG. 1). whereas FIG. 3 shows the same variant of the connector 1 when the wiper blade 2 is in the return position "C" (FIG. 1)

In FIG. 2 the connector 1 is elbow-shaped while in FIG. 3 the connector 1 is straight. This means that the intermediate portion 1c of the connector 1 is at least flexible, but in fact also resilient since, as explained above, the resilience of the connector 1 is indispensable for a normal working of the wiper system according to the invention.

The other two portions of the connector 1, i.e. the first portion 1a and the second portion 1b are respectively connected to the wiper arm extension 5 and to the wiper blade 2 (FIG. 1).

The first portion 1a of the connector 1 is rigidly secured to the arm extension 5, for example by molding said portion 1a onto the free end portion of the arm extension 5 For this purpose the free end portion of the arm extension 5 may be provided with one or more openings 5a and one or more of said openings 5a may include a pin 10 for reinforcing the connection between the arm extension 5 and the connector 1.

Other devices for attaching the connector 1 to the arm extension 5 may of course be used without departing from the scope of the present invention. For example: the connector 1 could be removably attached to the arm extension 5 and snap-on means could be used.

In the case of this first variant of the first embodiment of the connector (1) according to the invention the wiper blade 2 is rotatably attached to the connector 1 by means of a rivet (not shown) passing through the opening 9a of the portion 9 of the connector.

In the second variant of the first embodiment of the connector (11) according to the invention (FIG. 5) the wiper blade 2 also includes a rivet (not shown) and the connector 11 is rotatably and removably secured to said rivet of the wiper blade 2 by means of the known snap-on means 19a, 19b of the portion 19 of the connector. All other portions of the connector 11 are substantially the same as those of the connector 1, i.e. the connector 11 includes a corresponding first portion 11a, a corresponding second portion 11b and a corresponding resilient intermediate portion 11c.

FIG. 6 and FIG. 7 show the second embodiment of the connector (21) according to the invention. Just as for the first embodiment the connector 21 comprises a first portion 21a rigidly secured to the wiper arm extension 25, a second portion 21b rotatably attached to the wiper blade 2 (not shown) and a resilient intermediate portion 21c.

The free end portion of the arm extension 25 may include one or more openings and one or more of said openings may be provided with a pin 20. The wiper blade 2 (not shown) is rotatably attached to the portion 29 of the connector 21 by means of a rivet (not shown) passing through the opening 29a.

The connector according to FIG. 6 and FIG. 7 is further provided with a resilient blade 26 of which the object is to improve the resilience of the intermediate portion 21c of the connector 21. The resilient blade 26 may be partially located in a slot provided in the free end portion of the arm extension 25 and said slot may extend up to one of the openings provided in the free end portion of the arm extension 25.

A further means for improving the resilience of the intermediate portion of the connector according to the invention is to provide this portion with a locally reduced cross section such as for example shown in FIG. 6 at reference numeral 21d.

It is to be noted that, as shown in FIG. 4 through 7, one or more of the openings provided in the free end portion of the arm extension 5, 25 may be filled with the plastic material of the connector 1, 1 1, 21 (See reference numeral 25a of FIG. 6).

The connector (1, 11, 21) according to the invention is principally made in one piece and, as already mentioned above, it is made of an appropriate plastic material, whereas the resilient blade 26 (FIG. 6) is principally made of steel.

In FIG. 1 the rest position of the wiper system is the position "A" and in this position the connector 1 is elbow-shaped. However, the rest position of said wiper system could also be the position "C". In that case the stop means 6 would be located on the vehicle body or on the surface to be wiped 7 near the reference letter "A" and the connector 1 would be straight in its rest position, i.e. in the position "C" of FIG. 1 . In other words, the connector 1 of FIG. 3 can also be considered as being a connector in its rest position and the elbow-shaped configuration of the connector of FIG. 2 would then correspond to the return position of the wiper system.

As a consequence the resilient blade 26 of FIG. 6 can either be elbow-shaped or straight, depending as to whether the position "A" or the position "C" is the rest position of the wiper system.

I claim:

1. A connector for a wiper system of a motor vehicle or the like, said wiper system (1, 2, 3, 4, 5, 6) also comprising an oscillating mounting head (3), a channel (4) rotatably connected to the mounting head (3), an arm extension (5) rigidly secured to the channel (4) and provided with a free end portion, a wiper blade (2) attached to the free end portion of the arm extension (5) by means of the connector (1, 11, 21) and stop means (6) located on the surface to be wiped (7) or on the body (8) of the motor vehicle and capable of imparting a rotational movement to the wiper blade (2), characterized in that the connector (1, 11, 21) is made in one piece out of an appropriate plastic material and that it consists of a first portion (1a, 11a, 21a) rigidly secured to the free end portion of the arm extension (5, 25), of a second portion (1b, 11b, 21b) rotatably attached to the wiper blade (2) and of a resilient intermediate portion (1c, 11c, 21c) located between said first and second portions (1a, 1b; 11a, 11b; 21a, 21b), wherein the first portion (1a, 11a, 21a), second portion (1b, 11b, 21b) and resilient intermediate portion (1c, 11c, 21c) define a plane substantially parallel to the surface to be wiped, and wherein the wiper blade (2) is rotatable about an axis through the resilient intermediate portion (1c, 11c, 21c) of the connector, said axis extending substantially perpendicular to the surface to be wiped (7).

2. A connector according to claim 1, characterized in that the first portion (1a, 11a, 21a) of the connector is in linear alignment with the longitudinal axis of the arm extension (5) and in that the connector (1, 11, 21) has an elbow-shaped configuration when the wiper system (1, 2, 3, 4, 5) is in its rest position.

3. A connector according to claim 2, characterized in that the second portion (1b, 21b) of the connector (1, 21) is rotatably attached to the wiper blade (2) by means of a rivet.

4. A connector according to claim 2, characterized in that the second portion (11b) of the connector (11) is rotatably attached to the wiper blade (2) by means of a snap-on system (19, 19a, 19b).

5. A connector according to claim 2, characterized in that the resilient intermediate portion (21c) has locally a reduced cross section (21d).

6. A connector according to claim 1, characterized in that the connector has a straight configuration with the first portion (1a, 11a, 21a), second portion (1b, 11b, 21b), and resilient intermediate portion (1c, 11c, 21c) of the connector in linear alignment with the longitudinal axis of the arm extension (5) when the wiper system is in its rest position.

7. A connector according to claim 6, characterized in that the second portion (1b, 21b) of the connector (1, 21) is rotatably attached to the wiper blade (2) by means of a rivet.

8. A connector according to claim 6, characterized in that the second portion (11b) of the connector (11) is rotatably attached to the wiper blade (2) by means of a snap-on system (19, 19a, 19b).

9. A connector according to claim 6, characterized in that the resilient intermediate portion (21c) has locally a reduced cross section (21d).

10. A connector according to claim 1, characterized in that the second portion (1b, 21b) of the connector (1, 21) is rotatably attached to the wiper blade (2) by means of a rivet.

11. A connector according to claim 1, characterized in that the second portion (11b) of the connector (11) is rotatably attached to the wiper blade (2) by means of a snap-on system (19, 19a, 19b).

12. A connector according to claim 1, characterized in that the resilient intermediate portion (21c) has locally a reduced cross section (21d).

13. A connector for a wiper system of a motor vehicle or the like, said wiper system (1, 2, 3, 4, 5, 6) also comprising an oscillating mounting head (3), a channel (4) rotatably connected to the mounting head (3), an arm extension (5) rigidly secured to the channel (4) and provided with a free end portion, a wiper blade (2) attached to the free end portion of the arm extension (5) by means of the connector (1, 11, 21) and stop means (6) located on the surface to be wiped (7) or on the body (8) of the motor vehicle and capable of imparting a rotational movement to the wiper blade (2), characterized in that the connector (1, 11, 21) is made in one piece out of an appropriate plastic material and that it consists of a first portion (1a, 11a, 21a) rigidly secured to the free end portion of the arm extension (5, 25), of a second portion (1b, 11b, 21b) rotatably attached to the wiper blade (2) and of a resilient intermediate portion (1c, 11c, 21c) located between said first and second portions (1ai 1b; 11a, 11b; 21a, 21b) wherein the connector (1, 11, 21) has an elbow-shaped configuration when the wiper system (1, 2, 3, 4, 5) is in its rest position and wherein the resilience of the intermediate portion (21c) of the connector (21) is reinforced by a resilient, elbow-shaped blade (26).

14. A connector according to claim 13, characterized in that said resilient, elbow-shaped blade (26) is partially located in a slot provided in the free end portion of the arm extension (25).

15. A connector according to claim 14, characterized in that said resilient, elbow-shaped blade (26) is made of steel.

16. A connector according to claim 14, characterized in that the second portion (1b, 21b) of the connector (1, 21) is rotatably attached to the wiper blade (2) by means of a riveet.

17. A connector according to claim 14, characterized in that the second portion (11b) of the connector (11) is rotatably attached to the wiper blade (2) by means of a snap-on system (19, 19a, 19b).

18. A connector according to claim 14, characterized in that the resilient intermediate portion (21c) has locally a reduced cross section (21d).

19. A connector according to claim 13, characterized in that said resilient, elbow-shaped blade (26) is made of steel.

20. A connector according to claim 19, characterized in that the resilient intermediate portion (21c) has locally a reduced cross section (21d).

21. A connector according to claim 13, characterized in that the second portion (1b, 21b) of the connector (1, 21) is rotatably attached to the wiper blade (2) by means of a rivet.

22. A connector according to claim 13, characterized in that the second portion (11b) of the connector (11) is rotatably attached to the wiper blade (2) by means of a snap-on system (19, 19a, 19b).

23. A connector according to claim 13, characterized in that the resilient intermediate portion (21c) has locally a reduced cross section (21d).

24. A connector for a wiper system of a motor vehicle or the like, said wiper system (1, 2, 3, 4, 5, 6) also comprising an oscillating mounting head (3), a channel (4) rotatably connected to the mounting head (3), an arm extension (5) rigidly secured to the channel (4) and provided with a free end portion, a wiper blade (2) attached to the free end portion of the arm extension (5) by means of the connector (1, 11, 21) and stop means (6) located on the surface to be wiped (7) or on the body (8) of the motor vehicle and capable of imparting a rotational movement to the wiper blade (2), characterized in that the connector (1, 11, 21) is made in one piece out of an appropriate plastic material and that it consists of a first portion (1a, 11a, 21a) rigidly secured to the free end portion of the arm extension (5, 25), of a second portion (1b, 11b, 21b) rotatably attached to the wiper blade (2) and of a resilient intermediate portion (1c, 11c, 21c) located between said first and second portions (1a, 1b; 11a, 11b; 21a, 21b) wherein the connector has a straight configuration when the wiper system is in its rest position and wherein the resilience of the intermediate portion of the connector is reinforced by a straight, resilient blade.

25. A connector according to claim 24, characterized in that said straight, resilient blade is partially located in a slot provided in the free end portion of the arm extension (25).

26. A connector according to claim 25, characterized in that the second portion (1b, 21b) of the connector (1, 21) is rotatably attached to the wiper blade (2) by means of a rivet.

27. A connector according to claim 25, characterized in that the second portion (11b) of the connector (11) is rotatably attached to the wiper blade (2) by means of a snap-on system (19, 19a, 19b).

28. A connector according to claim 25, characterized in that the resilient intermediate portion (21c) has locally a reduced cross section (21d).

29. A connector according to claim 24, characterized in that said straight, resilient blade is made of steel.

30. A connector according to claim 29, characterized in that the resilient intermediate portion (21c) has locally a reduced cross section (21d).

31. A connector according to claim 24, characterized in that the second portion (1b, 21b) of the connector (1, 21) is rotatably attached to the wiper blade (2) by means of a rivet.

32. A connector according to claim 24, characterized in that the second portion (11b) of the connector (11) is rotatably attached to the wiper blade (2) by means of a snap-on system (19, 19a, 19b).

33. A connector according to claim 24, characterized in that the resilient intermediate portion (21c) has locally a reduced cross section (21d).

* * * * *